Figure 1:
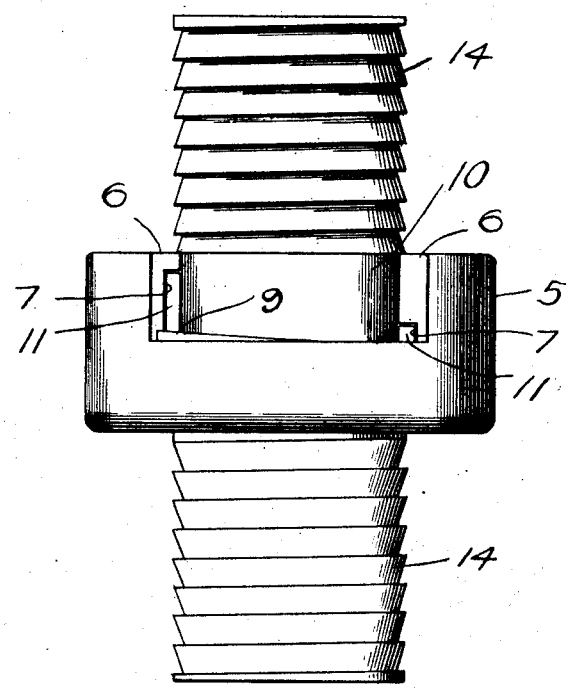

No. 873,892. PATENTED DEC. 17, 1907.
G. E. PETTERSON.
HOSE COUPLING.
APPLICATION FILED APR. 27, 1907.

2 SHEETS—SHEET 1.

Witnesses
Inventor
Gustaf E. Petterson
By
Attorneys

No. 873,892.                                    PATENTED DEC. 17, 1907.
G. E. PETTERSON.
HOSE COUPLING.
APPLICATION FILED APR. 27, 1907.

2 SHEETS—SHEET 2.

Witnesses                                      Inventor
                                               Gustaf E. Petterson
                                          By   Chandlee & Chandlee
                                                          Attorneys

UNITED STATES PATENT OFFICE.

GUSTAF E. PETTERSON, OF PINE BLUFF, ARKANSAS.

HOSE-COUPLING.

No. 873,892.  Specification of Letters Patent.  Patented Dec. 17, 1907.

Application filed April 27, 1907. Serial No. 370,641.

*To all whom it may concern:*

Be it known that I, GUSTAF E. PETTERSON, a subject of the King of Sweden, residing at Pine Bluff, in the county of Jefferson, State of Arkansas, have invented certain new and useful Improvements in Hose-Couplings; and I do hereby declare the following to be a full, clear, and exact description of the invention, such as will enable others skilled in the art to which it appertains to make and use the same.

The present invention relates to hose couplings, and it aims to provide an exceedingly simple as well as highly efficient device of this character, in which the coupling members have a positive interlocking engagement and are thus held against accidental uncoupling.

The invention will be readily understood from a consideration of the following detailed description, and its preferred embodiment is illustrated in the accompanying drawings, in which like parts are designated by corresponding reference numerals in the several views.

Figure 4:
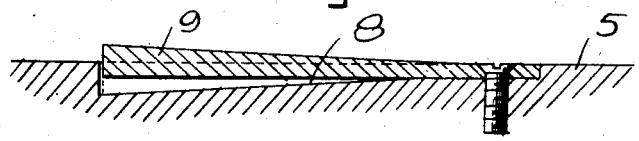
Figure 2:
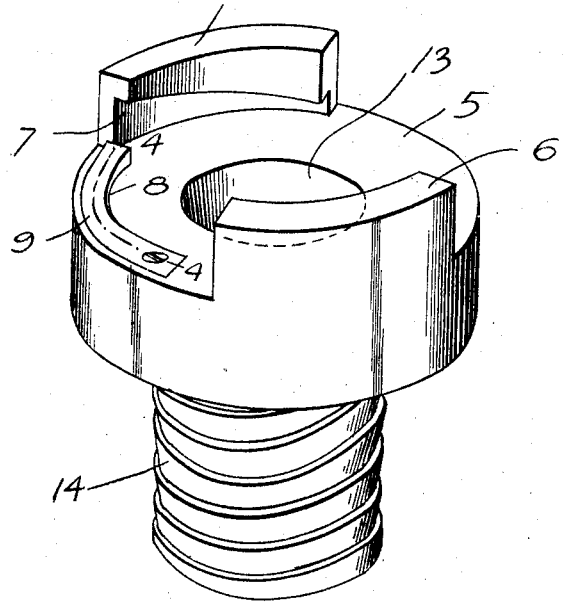
Figure 3:
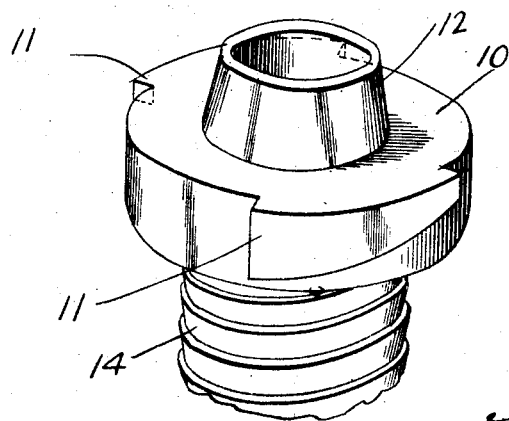

Of the said drawings—Figure 1 is a side elevation of the invention, with the coupling members thereof in engagement with each other. Fig. 2 is a perspective view of the female coupling member. Fig. 3 is a similar view of the male coupling member. Fig. 4 is a section on the line 4—4 of Fig. 2.

Referring more particularly to the drawings, the female member 5 of the coupling is shown as provided upon its forward face with a pair of diametrically opposite forwardly-projecting lugs 6, which are disposed adjacent the periphery thereof, each of said lugs having its inner face under-cut, as indicated by the reference numeral 7, to form a transverse groove, which extends from side to side thereof, the groove of one lug being tapered reversely to that of the other lug. Each lug forms an arc approximately 90° in extent. The member 5 is further provided upon its forward face with an arcuate seat 8, in which a spring 9 is fitted and secured at one end, the free end of said spring extending up to the adjacent end of one of the lugs.

The male member 10 of the coupling, whose diameter is approximately equal to the distance between the inner faces of the lugs 6, is in turn provided with a pair of laterally-projecting shoulders 11, formed at diametrically opposite points upon its periphery, each of said shoulders being wedge-shaped, the inclination of one shoulder being the reverse of that of the other shoulder, so that when the coupling members are in place and are given a partial rotation in one direction, each shoulder will enter the groove in the corresponding lug. The male member is further provided with a reduced tongue 12, which fits in a central opening 13, formed through the coupling member 5, the depth of said opening being slightly greater than the length of the tongue 12, to receive therein a compressible gasket, not shown. Each of the coupling members further includes a screw-threaded tubular extension 14, formed integral therewith for insertion into the hose.

In coupling the members together the tongue 12 is inserted in the opening 13, and one of said members is then given a partial rotation with respect to the other, when one shoulder 11 formed on the male member will ride along the upper face of the spring 9, pressing the same downwardly until said shoulder is completely disposed within the groove in the corresponding lug, when said spring will be free to rise to its normal position, thus extending across the open larger end of said groove and preventing any retrograde movement of either coupling member, the tapered formation of the groove in the shoulders preventing a continuation of the original movement of said members. In uncoupling the members it is only necessary to depress the spring within its seat, when either coupling member may be rotated with respect to the other to withdraw the shoulders from the grooves.

Changes in the form, proportion, and minor details of construction within the scope of the appended claims, may be resorted to without departing from the spirit of the present invention.

What is claimed, is—

The combination of an annular coupling member provided with a pair of forwardly-projecting arcuate lugs disposed opposite each other, each lug having a wedge-shaped groove formed in its inner face and extending from side to side thereof, the lower edge of the groove coinciding with the front face of the coupling member, said member having a tapered arcuate seat formed in its front face and terminating at one end in close proximity to the larger end of one of said grooves, a second annular coupling member provided with a pair of oppositely-disposed laterally-projecting wedge-shaped shoulders adapted for interlocking engagement in said grooves, to prevent rotation of said members with respect to each other in one direction, and a tapered arcuate spring secured at its smaller end in said seat and having a length co-extensive therewith, the enlarged free end of the spring being disposed normally above said seat and adapted to contact with the larger end of the adjacent shoulder of the other member when in locked position, to prevent rotation of said members with respect to each other in the opposite direction.

In testimony whereof, I affix my signature, in presence of two witnesses.

GUSTAF E. PETTERSON.

Witnesses:
    JNO. L. MILLS,
    HENRY ROBERTS.